United States Patent
Ogawa et al.

(10) Patent No.: US 7,561,455 B2
(45) Date of Patent: Jul. 14, 2009

(54) MEMORY SYSTEM USING SINGLE WAVELENGTH OPTICAL TRANSMISSION

(75) Inventors: Toshio Ogawa, Kawasaki (JP); Yoshihiro Takemae, Kasugai (JP); Yoshinori Okajima, Kawasaki (JP); Tetsuhiko Endo, Kawasaki (JP); Yasuro Matsuzaki, Kawasaki (JP)

(73) Assignee: Fujitsu Microelectronics Limited, Tokyo (JP)

( * ) Notice: Subject to any disclaimer, the term of this patent is extended or adjusted under 35 U.S.C. 154(b) by 200 days.

(21) Appl. No.: 11/498,175

(22) Filed: Aug. 3, 2006

(65) Prior Publication Data

US 2007/0230231 A1  Oct. 4, 2007

(30) Foreign Application Priority Data

Mar. 29, 2006  (JP) ............................. 2006-090920

(51) Int. Cl.
 *G11C 13/04*  (2006.01)
(52) U.S. Cl. .................... 365/64; 365/189.17; 365/198; 365/215
(58) Field of Classification Search .................. 365/64, 365/189.17, 215, 198
 See application file for complete search history.

(56) References Cited

U.S. PATENT DOCUMENTS

| 6,697,888 | B1 * | 2/2004 | Halbert et al. ................. 710/52 |
| 7,200,024 | B2 * | 4/2007 | Taylor .......................... 365/64 |
| 7,254,331 | B2 * | 8/2007 | Murphy ........................ 398/70 |
| 7,313,332 | B2 * | 12/2007 | Pappalardo et al. ......... 398/183 |
| 2002/0178319 | A1 * | 11/2002 | Sanchez-Olea ............. 710/305 |
| 2003/0043426 | A1 * | 3/2003 | Baker et al. ................. 359/109 |
| 2007/0189052 | A1 * | 8/2007 | Ogawa et al. ................. 365/64 |

FOREIGN PATENT DOCUMENTS

JP  2005-064950 A  3/2005

* cited by examiner

*Primary Examiner*—Van Thu Nguyen
*Assistant Examiner*—Alexander Sofocleous
(74) *Attorney, Agent, or Firm*—Fujitsu Patent Center

(57) ABSTRACT

A controller converts a parallel command signal and address signal, or a parallel write data signal into a first serial signal, and outputs the converted signal as a first optical signal with a single wavelength to a memory device via an optical transmission line. The memory device converts the first optical signal into the original parallel command signal, address signal, and write data signal, and outputs the converted parallel signals to a memory unit. The memory device converts a parallel read data signal from the memory unit into a second serial signal, and outputs the converted signal to the controller via the optical transmission line as a second optical signal with a single wavelength. It is unnecessary to transmit the optical signal using an optical multiplexer, an optical demultiplexer, etc., thereby improving transmission rate of signals transmitted between the controller and the memory device at minimum cost.

13 Claims, 17 Drawing Sheets

MEMORY SYSTEM USING SINGLE WAVELENGTH OPTICAL TRANSMISSION

CROSS REFERENCE TO RELATED APPLICATION

This application is based upon and claims the benefit of priority from Japanese Patent Application No. 2006-090920, filed on Mar. 29, 2006, the entire contents of which are incorporated herein by reference.

BACKGROUND OF THE INVENTION

1. Field of the Invention

The present invention relates to a memory system including memory device and a memory controller via which the memory device is accessed.

2. Description of the Related Art

A microcontroller such as a CPU comes to have higher performance year by year. In accordance therewith, memory devices accessed by the microcontrollers and memory controllers need to have higher performance. Specifically, transfer rates (band widths) of data signals and so on between the microcontrollers and the memory devices have to be improved. In order to improve the transfer rate, in a certain kind of memory device, the number of bits in data signals is increased. Another memory device implements an interface circuit transferring serial data signals by using a high-frequency clock. Further, currently being considered are interface circuits transferring data signals each consisting of a plurality of bits, by using high-frequency clocks.

Interface circuits of conventional memory devices use electrical signals. The upper limit transfer rate of the electrical signals is said to be about 10 Gbps, and when it requires transfer rates higher than this, new interface circuits using optical signals and the like have to be considered.

For example, an art in which an optical interface is adopted between a microcontroller and a memory controller has been proposed (see, for example, Japanese Unexamined Patent Application Publication No. 2005-64950).

The Japanese Unexamined Patent Application Publication No. 2005-64950, however, does not describe details of the interface between the memory controller and memory devices. That is, it does not disclose the technology for improving transfer rates of signals transferred between the memory controllers and the memory devices.

SUMMARY OF THE INVENTION

It is an object of the present invention to improve the transfer rate of signals transferred between a memory controller and memory devices at the minimum cost.

In one aspect of a memory system of the present invention, when reading/writing data from/to a memory unit of a memory device, a controller converts a parallel command signal and address signal into a first serial signal. At write access, a parallel write data signal is also converted into the first serial signal. The first serial signal is outputted to the memory device via an optical transmission line as a first optical signal with a single wavelength. The memory device converts the first optical signal into the original parallel command signal and address signal, or the original parallel write data signal and outputs the converted parallel signals to the memory unit. At read access, the memory device converts a parallel read data signal from the memory unit into a second serial signal. The second serial signal is outputted to the controller via the optical transmission line as a second optical signal with the signal wavelength. The controller converts the second optical signal supplied from the memory device into the parallel read data signal. As described above, converting the parallel signal into the serial signal and outputting the converted serial signal to the optical transmission line as the optical signal with the single wavelength eliminates the necessity to multiplex the optical signal using an optical multiplexer. Moreover, it is unnecessary to separate a multiplexed optical signal using an optical demultiplexer. Accordingly, the transmission rate of signals transmitted between the controller and the memory device can be improved at a minimum cost.

BRIEF DESCRIPTION OF THE DRAWINGS

The nature, principle, and utility of the invention will become more apparent from the following detailed description when read in conjunction with the accompanying drawings in which like parts are designated by identical reference numbers, in which.

DESCRIPTION OF THE PREFERRED EMBODIMENTS

Figure 1:
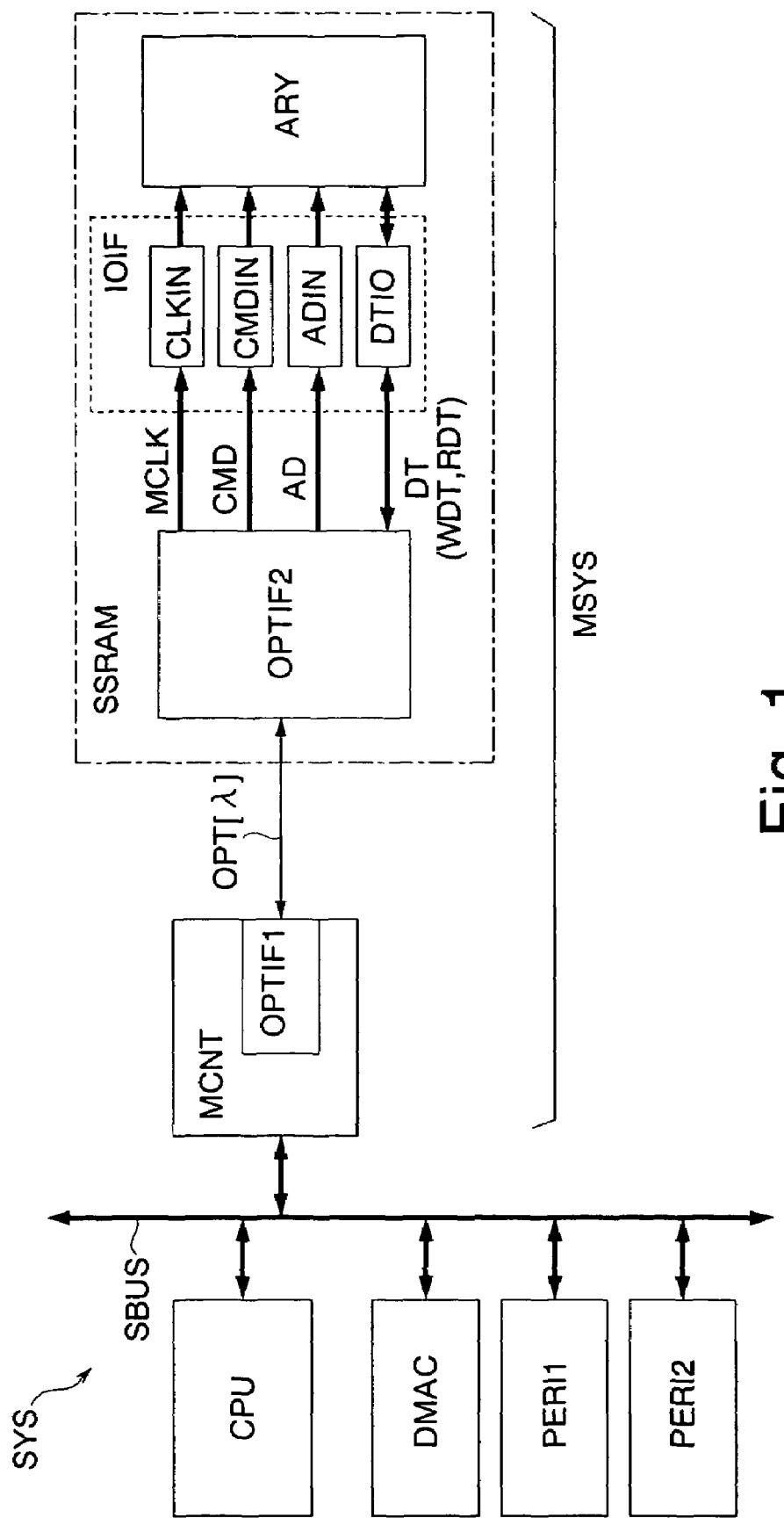
FIG. 1 is a block diagram showing a first embodiment.

Hereinafter, embodiments of the present invention will be described, using the drawings. In the drawings, each signal line shown with a heavy line is configured by a plurality of signal lines. Part of the blocks to which the heavy lines are connected is configured by a plurality of circuits. Further, each signal line through which a signal is transmitted is denoted by the same reference symbol as the name of the signal.

FIG. 1 shows a first embodiment of the present invention. In this embodiment, a memory system MSYS is composed of a memory controller MCNT and a synchronous SRAM (memory device). The synchronous SRAM (hereinafter referred to as an SSRAM) is connected to the memory controller MCNT by an optical transmission line. The optical transmission line is composed of a single optical cable OPT through which an optical signal with a single wavelength $\lambda$ is transmitted. The memory controller MCNT, together with a CPU (microprocessor), a DMAC, and peripheral devices PERI1-2, is connected to a system bus SBUS. The system bus SBUS includes an electrical interface. A system SYS is composed of the CPU, the DMAC, the peripheral devices PERI1-2, the memory controller MCNT, and the SSRAM. In this embodiment, optical signals on the optical transmission line are transmitted by half-duplex communication.

The memory controller MCNT is formed by mounting an optical interface unit OPTIF1 and an optical connector not shown on a printed-circuit board or the like. The SSRAM includes an optical interface unit OPTIF2, an input/output interface unit IOIF, and a memory cell array ARY (memory unit) including a plurality of memory cells arranged in a matrix. The input/output interface unit IOIF includes a clock input circuit CLKIN, a command input circuit CMDIN, and an address input circuit ADIN which respectively receive a memory clock MCLK, a command signal CMD, and an address signal AD and transmit the received signals to the memory cell array ARY, and a data input/output circuit DTIO which transmits a write data signal WDT to the memory cell array ARY and transmits a read data signal RDT to the optical interface unit OPTIF2.

For example, the optical interface unit OPTIF2 is connected to the optical cable OPT via an optical connector formed on a flexible printed-circuit board (not shown) on which the SSRAM is mounted. In the present invention, the SSRAM is accessed by the CPU and the DMAX via the memory controller MCNT.

When the SSRM is accessed, the controller MCNT outputs the command signal CMD, the address signal AD, and the write signal DT (WDT) received via the system bus SBUS as an optical signal OPT (first optical signal). The command signal CMD, the address signal AD, and the write data signal DT supplied from the controller MCNT via the optical interface unit OPTIF2 are outputted to the memory cell array ARY via the input circuits CMDIN, ADIN and the data input/output circuit DTIO. The read data signal DT (RDT) read from the memory cell array ARY is outputted to the optical interface unit OPTIF2 via the data input/output circuit DTIO. The controller MCNT outputs the received read data signal RDT to the system bus SBUS.

The optical interface unit OPTIF2 converts the read data signal DT into the optical signal OPT (second optical signal) with the single wavelength and outputs it to the controller MCNT. Further, the optical interface unit OPTIF2 extracts a first synchronous clock from the optical signal OPT supplied from the controller MCNT and generates the memory clock MCLK (second synchronous clock) to operate the SSRAM in synchronization with the extracted first synchronous clock. The memory clock MCLK is supplied to the SSRAM via the clock input circuit CLKIN and simultaneously outputted as the optical signal to the controller MCNT via the optical cable OPT. The details of control of the clock will be described later using FIG. 3 and FIG. 4.

Figure 2:
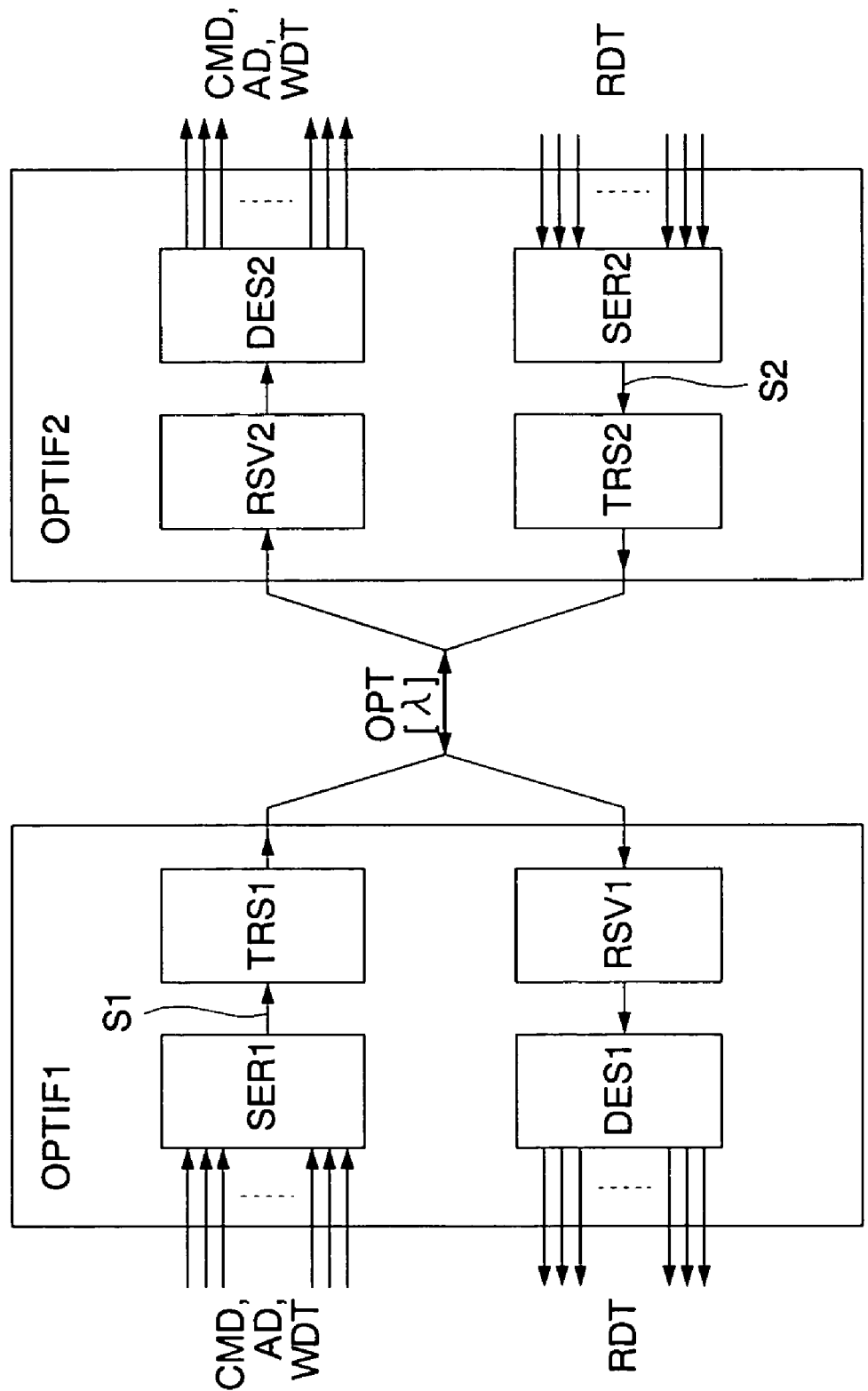
FIG. 2 is a block diagram showing the details of the optical interface unit of FIG. 1.

FIG. 2 shows the details of the optical interface units OPTIF1-2 shown in FIG. 1. The optical interface unit OPTIF1 includes a first serial converting unit SER1, a first optical output unit TRS1, a first optical input unit RSV1, and a first parallel converting unit DES1. The optical interface unit OPTIF2 includes a second optical input unit RSV2, a second parallel converting unit DES2, a second serial converting unit SER2, and a second optical output unit TRS2.

The first serial converting unit SER1 and the first parallel converting unit DES1 treat electrical signals. The first serial converting unit SER1 converts the parallel command signal CMD, address signal AD, and write data signal WDT into a first serial signal S1. The first optical output unit TRS1 outputs the first serial signal S1 as the first optical signal OPT with the single wavelength λ to the optical interface unit OPTIF2 via the optical transmission line OPT. The first optical input unit RSV1 receives the second optical signal OPT supplied from the optical interface unit OPTIF2. As described above, the first optical output unit TRS1 and the first optical input unit RSV1 operate as an electrical/optical converter and an optical/electrical converter. The first parallel converting unit DES1 converts the serial second optical signal OPT received by the first optical input unit RSV1 into the parallel read data signal RDT.

The optical interface unit OPTIF1 includes the electrical/optical converter which converts the command signal CMD, the address signal AD, and the write data signal WDT supplied from the system bus SBUS into the optical signal and the optical/electrical converter which converts the read data signal RDT to be outputted to the system bus SBUS into an electrical signal.

On the other hand, the second optical input unit RSV2 receives the serial first optical signal OPT supplied from the optical interface unit OPTIF1. The second parallel converting unit DES2 converts the first optical signal OPT to the original parallel command signal CMD, address signal AD, and write data signal WDT and outputs the converted parallel signals to the memory cell array ARY shown in FIG. 1. The second serial converting unit SER2 converts the parallel read data signal RDT from the memory cell array ARY into a second serial signal S2. The second optical output unit TRS2 outputs the second serial signal S2 as the second optical signal OPT with the single wavelength λ to the controller MCNT. The second parallel converting unit DES2 and the second serial converting unit SER2 treat electrical signals. The second optical input unit RSV2 and the second optical output unit TRS2 operate as an optical/electrical converter and an electrical/optical converter.

Incidentally, when the system bus SBUS includes an optical interface, in the optical interface unit OPTIF1, the first serial converting unit SER1 and the first parallel converting unit DES1 treat optical signals. Similarly, when the memory cell array ARY includes an optical interface, in the optical interface unit OPTIF2, the second parallel converting unit DES2 and the second serial converting unit SER2 treat optical signals.

Figure 3:
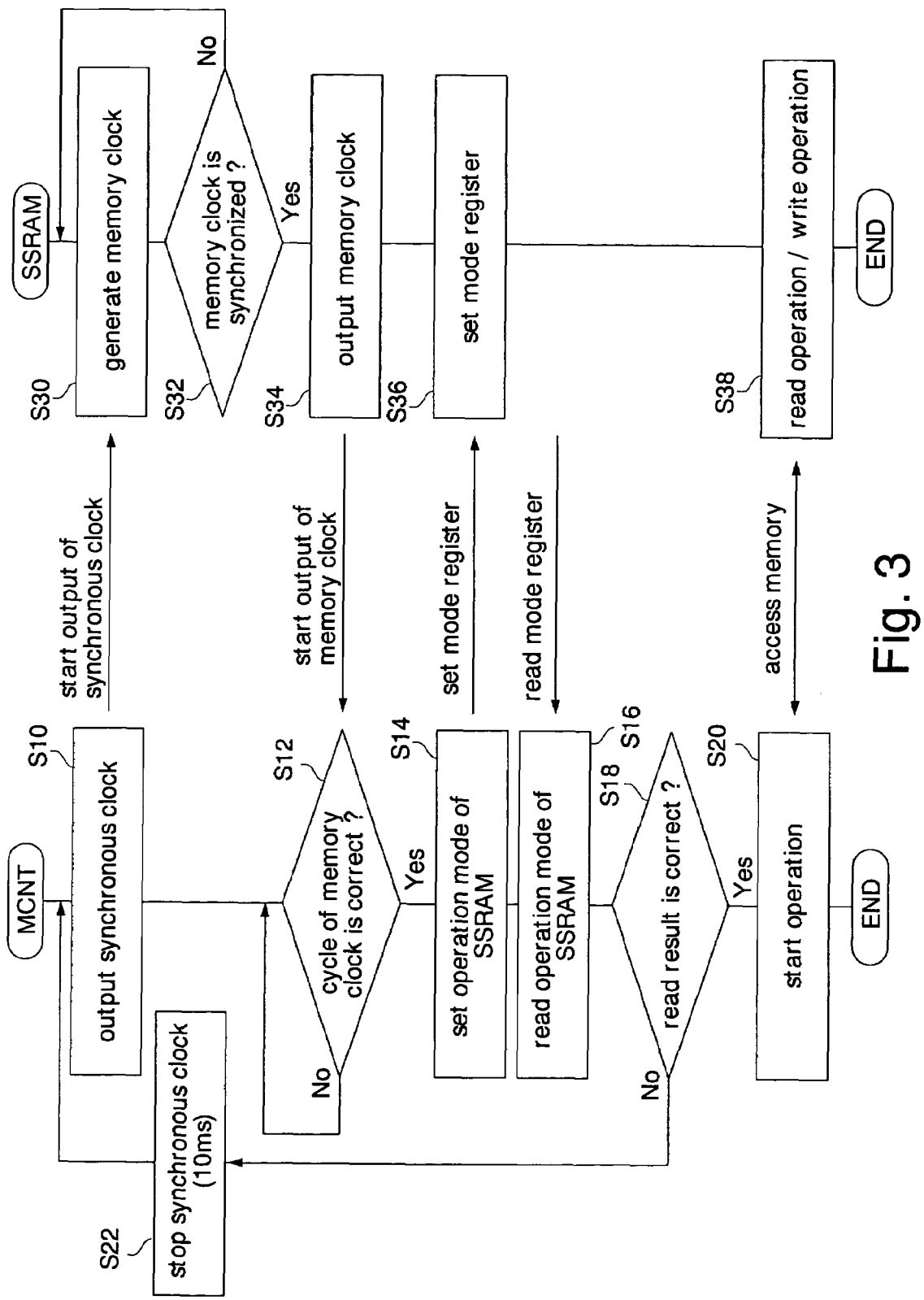
FIG. 3 is a flowchart showing an operation of the memory system according to the first embodiment.

FIG. 3 shows an operation of the memory system MSYS of the first embodiment. A flow on the left side of the figure shows an operation of the controller MCNT (OPTIF1). A flow on the right side of the figure shows an operation of the SSRAM (OPTIF2). This operation is performed before read/write access to the SSRAM is started. For example, this operation is performed during a power-on sequence of the system SYS shown in FIG. 1.

First, the controller MCNT outputs the synchronous clock (first synchronous clock) as the optical signal OPT to the SSRAM in order to synchronize the operation of the SSRAM with the operation of the controller MCNT (step S10). The synchronous clock is outputted during the operation of the system SYS without interruption. The SSRAM receives the synchronous clock, for example, by a PLL circuit and generates the memory clock MCLK (second synchronous clock) synchronized with the synchronous clock (step S30). After determining that the memory clock MCLK is synchronized with the synchronous clock (step S32), the SSRAM outputs the memory clock MCLK as the optical signal OPT to the controller MCNT (step S34).

After determining that the cycle of the memory clock MCLK is equal to the cycle of the synchronous clock (step S12), the controller MCNT outputs a mode register setting command as the optical signal OPT in order to set the operation mode of the SSRAM (step S14). In response to the mode register setting command, the SSRAM sets its own mode register (step S36). As a result, the operation mode of the SSRAM is set to any of plural kinds of operation modes. As the operation mode, for example, the burst length or the latency is set. The burst length indicates the number of data signals DT inputted/outputted in response to one read command or write command. The latency indicates the number of clock cycles from the receipt of the read command until the output of the read data signal RDT.

The controller MCNT outputs a mode register reading command as the optical signal OPT in order to know a value set in the mode register of the SSRAM (step S16). The controller MCNT determines whether the set operation mode is correct based on the value of the mode register read from the SSRAM (step S18). If the value of the mode register is correct, the normal operation is started (step 20). Namely, the controller MCNT accesses the SSRAM, and the SSRAM performs a read operation and a write operation (step S38). On the other hand, if the value of the mode register is incorrect, the controller MCNT temporarily stops the output of the synchronous clock without starting the output of the read command and the write command (step S22). For example, after 10 ms, the controller MCNT starts again the output of the synchronous clock in order to synchronize the operation of the SSRAM with the operation of the controller MCNT.

As described above, the controller MCNT starts accessing the SSRAM after determining that the memory clock is synchronized with the synchronous clock. Therefore, when the memory system MSYS is constructed using the optical signal OPT, the SSRAM can be accessed without introducing errors. After setting the mode register, the controller MCNT checks up the value set in the mode register using the mode register reading command. Writing and reading from the mode register before performing a read access operation or a write access operation makes it possible to detect a match between the cycles of the synchronous clock and the memory clock and a slight deviation in operation timing between the controller MCNT and the SSRAM. Accordingly, when the memory system MSYS is constructed using the optical signal OPT, the SSRAM can be more reliably accessed.

Figure 4:
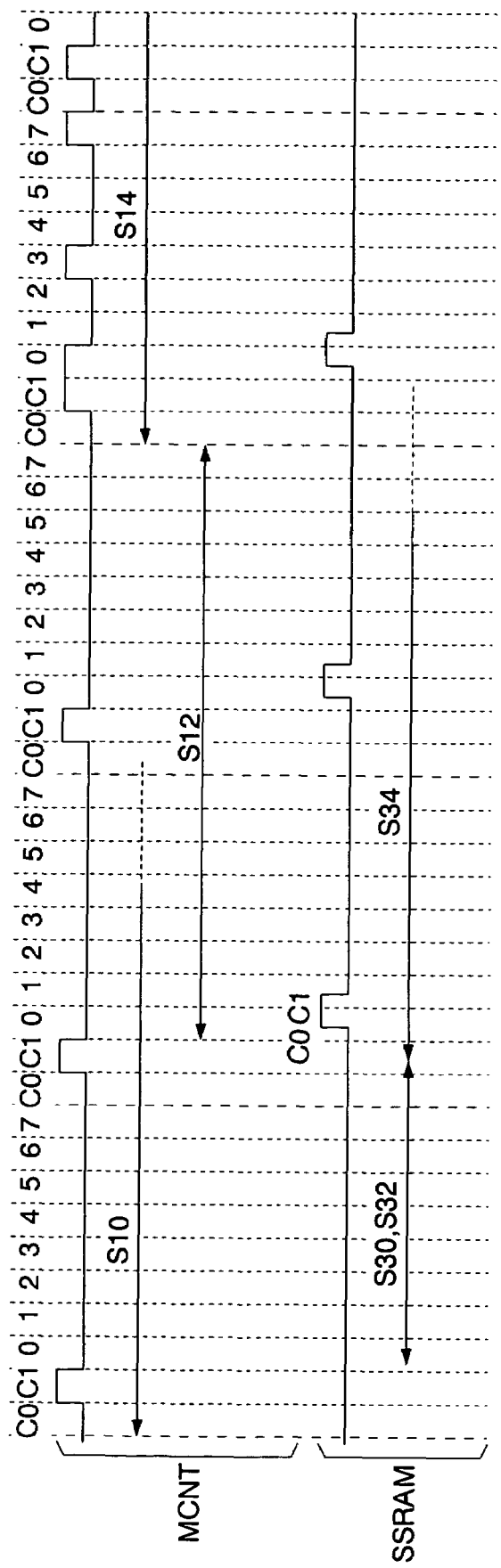
FIG. 4 is a timing diagram showing an overview of the steps S10-S14, S30-34 of FIG. 3.

FIG. 4 shows an overview of the steps S10-S14, S30-S34 shown in FIG. 3. The waveform in the figure shows the optical signal OPT. In this embodiment, one unit of optical transmission from the controller MCNT to the SSRAM and one unit of optical transmission from the SSRAM to the controller MCNT are 10 cycles (one clock cycle). The synchronous clock is sent using two cycles out of 10 cycles, and the command signal CMD, the address signal AD, and the data signal DT are sent using the remaining eight cycles. The synchronous clock and the memory clock are represented by a low logic level of a C0 cycle and a high logic level of a C1 cycle. The C0-C1 cycles always come at the head of 10 cycles. A transition edge from the low logic level to the high logic level occurs once at least every ten cycles, so that the SSRAM and the controller MCNT each can recognize the clock from its partner.

In step S10, the controller MCNT outputs the synchronous clock (C0, C1). In step S30, S32, the SSRAM generates the memory clock synchronized with the synchronous clock. Note that in actuality, for example, about 100 clock cycles are needed in order that the memory clock is synchronized. The SSRAM then starts the output of the memory clock (C0, C1) in step S34.

In step S12, the controller MCNT determines that the cycle of the memory clock matches that of the synchronous clock, and in step S14, outputs the mode register setting command.

Figure 5:
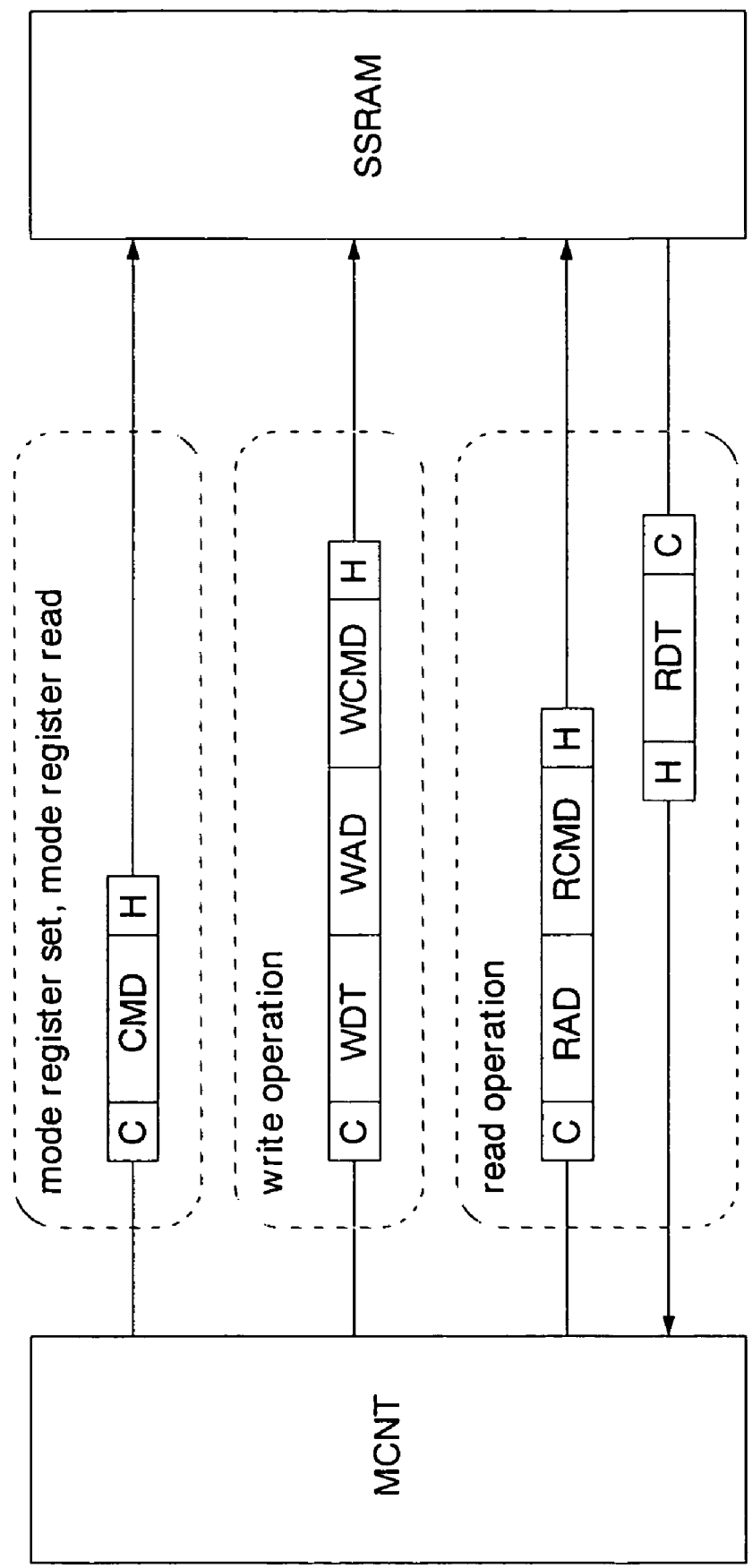
FIG. 5 is an explanatory diagram showing an operation of the memory system according to the first embodiment.

FIG. 5 shows the operation of the memory system MSYS of the first embodiment. Various commands outputted from the controller MCNT to the SSRAM and the read data outputted from the SSRAM to the controller MCNT are inserted as a payload between a header H and an error correcting data C. The error correcting data C is a CRC (Cyclic Redundancy Check) code or an ECC (Error Correcting Code).

In outputting the mode register setting command and the mode register reading command, a command CMD is inserted between the header H and the error correcting data C. In the write operation, a write command WCMD, a write address WAD, and write data WDT are inserted between the header H and the error correcting data C. In the read operation, a read command RCMD and a read address RAD are inserted between the header H and the error correcting data C. The output of read data from the SSRAM is performed by inserting read data RDT between the header H and the error correcting data C.

Figure 6:
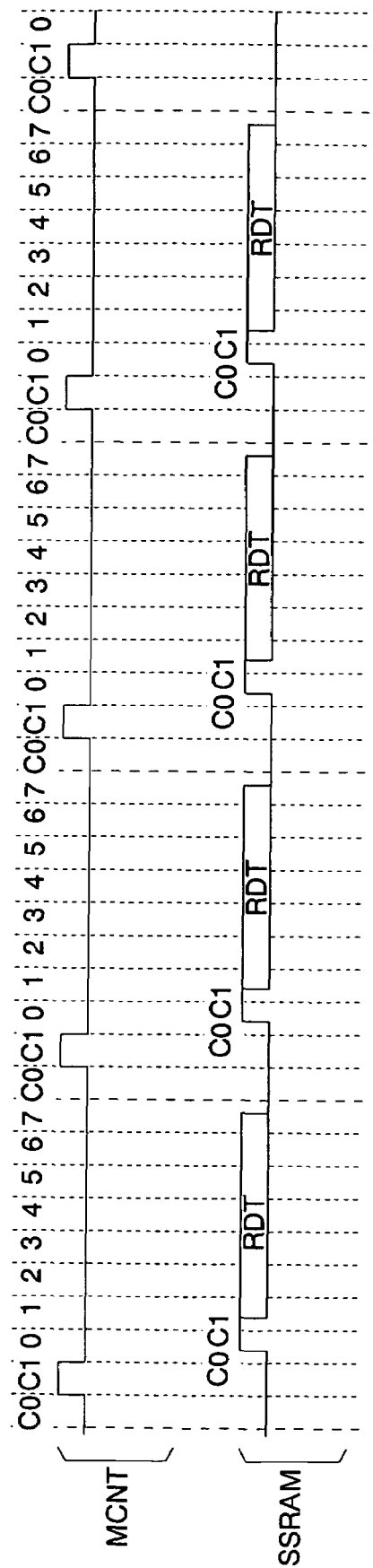
FIG. 6 is a timing diagram showing an overview of the read operations according to the first embodiment.

FIG. 6 shows an overview of the read operation shown in FIG. 5 and shows a state where the read data RDT is outputted as the optical signal from the SSRAM to the controller MCNT. The C1 cycle of the memory clock and the read data RDT from the SSRAM are outputted while avoiding the C0-C1 cycles of the synchronous clock from the controller MCNT. By outputting the read data RDT to the controller MCNT during a period which does not overlap the C0-C1 cycles of the controller MCNT, half-duplex communication of the optical signal can be realized. As a result, complicated control such as cancellation of reflection at a receiving end of the transmitted optical signal becomes unnecessary, and hence the optical interface units OPTIF1-2 shown in FIG. 1 can be easily configured. Namely, it is possible to minimize an increase in the cost of the memory system MSYS and greatly improve the signal transmission rate as compared with the electrical signal.

As described above, in the first embodiment, optical signals can be transmitted between the controller MCNT and the SSRAM using a single optical cable OPT1. Since the parallel signal is converted into the serial signal and the converted serial signal is transmitted as the optical signal, the signal can be transmitted using the optical signal with the single wavelength. Further, by transmitting the read data signal RDT during the period which does not overlap the C0-C1 cycles, half-duplex communication can be realized. Accordingly, the optical interface units OPTIF1-2 can be easily configured. More specifically, it is unnecessary to multiplex the optical signal using an optical multiplexer. Also, it is unnecessary to separate the multiplexed optical signal using an optical demultiplexer. Consequently, also when an optical signal interface is adopted for the memory system MSYS, the signal transmission rate can be improved at a minimum cost.

After determining that the memory clock is synchronized with the synchronous clock, and further setting and checking the mode register, the controller MCNT performs the read access operation or the write access operation. Therefore, it is possible to detect a match between the cycles of the synchronous clock and the memory clock and a deviation in operation timing before the access operation. With the use of the optical signal OPT, the SSRAM can be certainly accessed.

Figure 7:
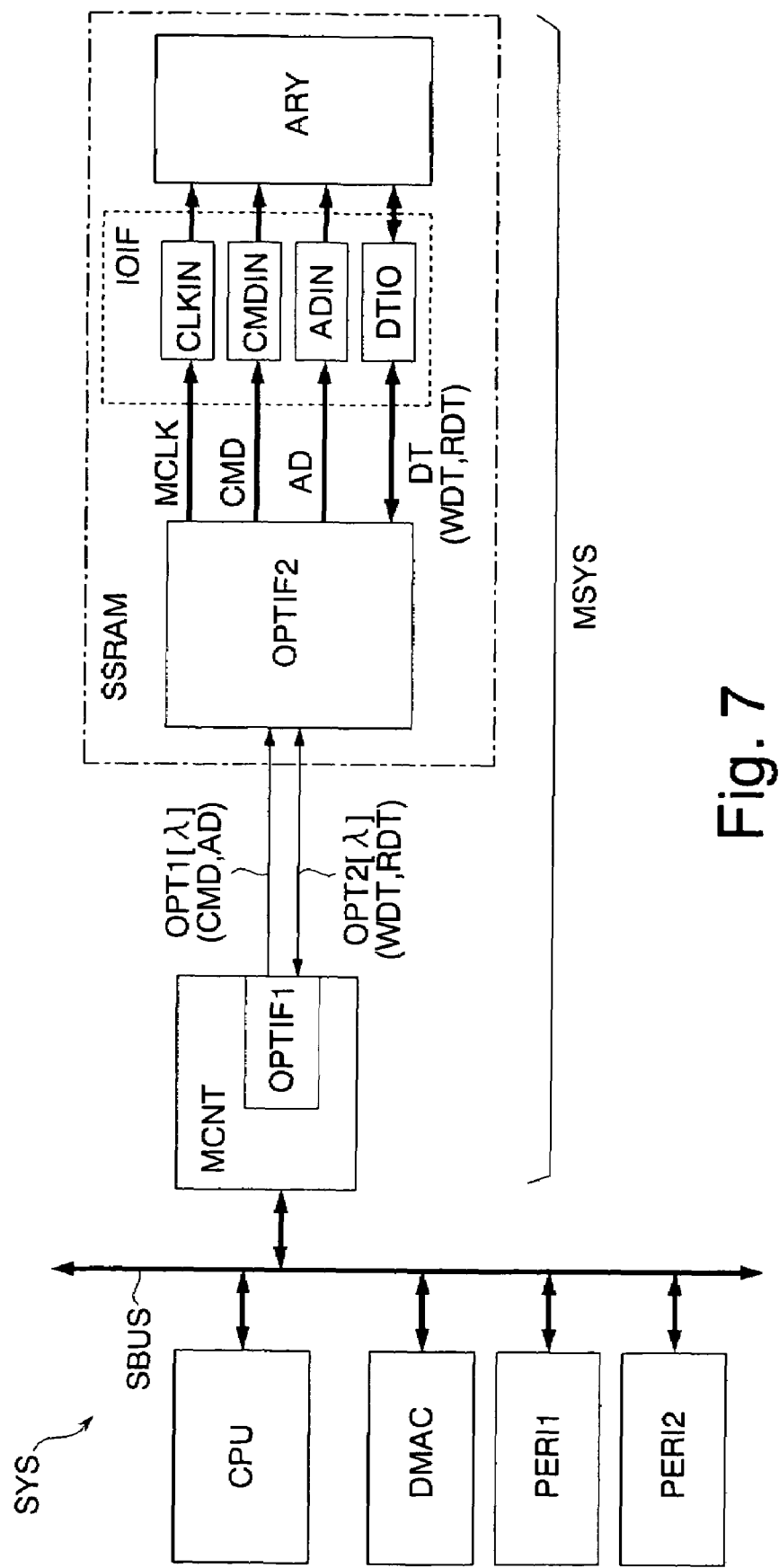
FIG. 7 is a block diagram showing a second embodiment.
Figure 8:
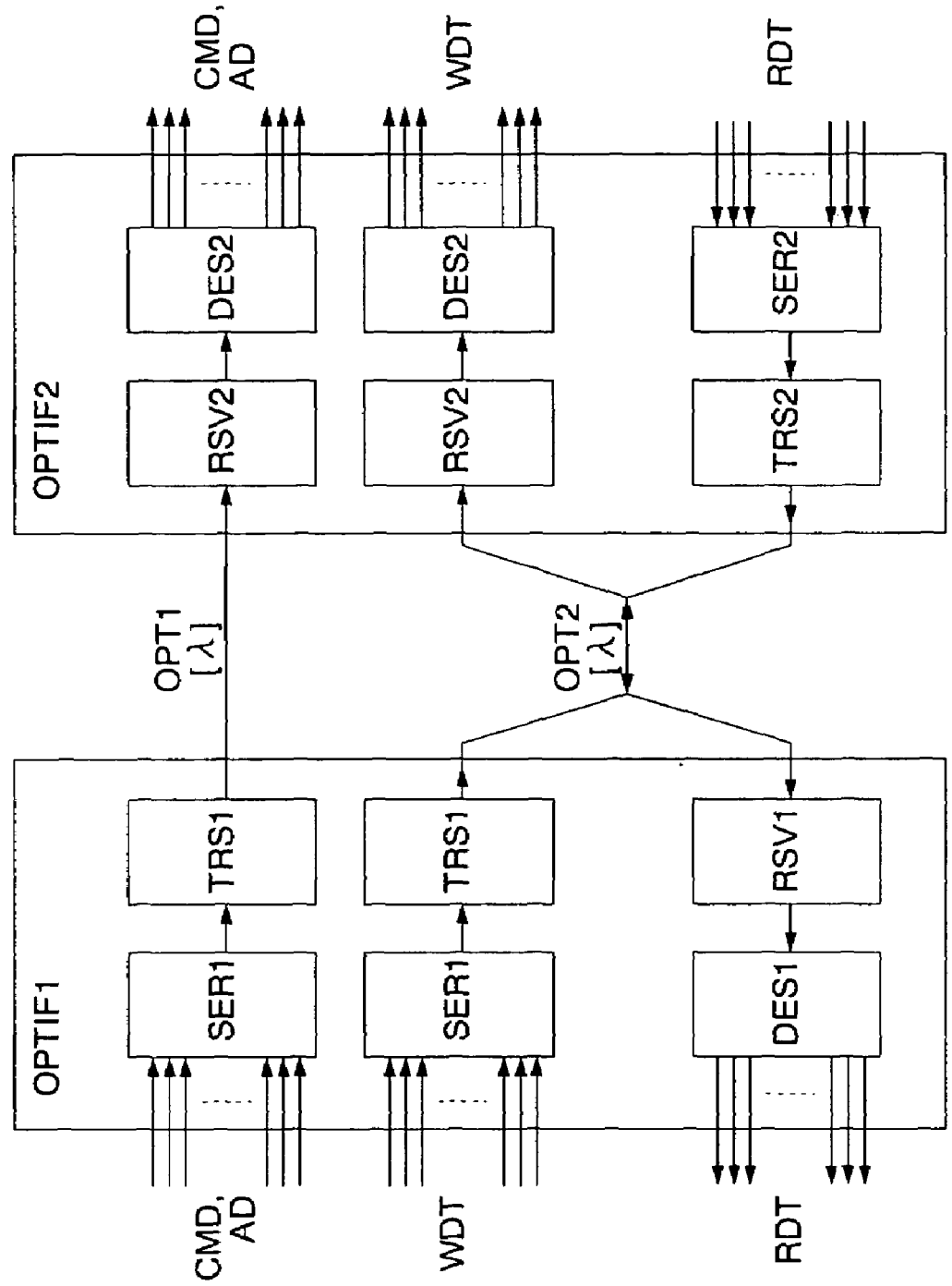
FIG. 8 is a block diagram showing the details of the optical interface unit of FIG. 7.

FIG. 7 shows a second embodiment of the present invention. The same numerals and symbols will be used to designate the same elements as those described in the first embodiment, and the detailed description thereof will be omitted. In this embodiment, the optical transmission line which connects the optical interface units OPTIF1-2 is configured by using two optical cables OPT1-2. Optical signals with the single wavelength λ are transmitted to the optical cables OPT1-2. The optical cable OPT1 (first optical transmission line) transmits the command signal CMD and the address signal AD as the first optical signal from the optical interface unit OPTIF1 to the optical interface unit OPTIF2. The optical cable OPT2 (second optical transmission line) transmits the write data signal WDT and the read data signal RDT as the first and second optical signals between the optical interface units OPTIF1-2. Therefore, the optical interface units OPTIF1-2 each include a circuit exclusively for the write data signal WDT as shown in FIG. 8 described later. The other configuration is the same as that of the first embodiment.

FIG. 8 shows the details of the optical interface units OPTIF1-2 shown in FIG. 7. The same numerals and symbols will be used to designate the same elements as those in FIG. 2, and the detailed description thereof will be omitted.

The optical interface unit OPTIF1 includes the first serial converting unit SER1 and the first optical output unit TRS1 for the command signal CMD and the address signal AD, and the first serial converting unit SER1 and the first optical output unit TRS1 exclusively for the write data signal WDT. The optical interface unit OPTIF2 includes the second optical input unit RSV2 and the second parallel converting unit DES2 for the command signal CMD and the address signal AD, and the second optical input unit RSV2 and the second parallel converting unit DES2 exclusively for the write data signal WDT. The other configuration is the same as that of FIG. 2.

As described above, also in the second embodiment, the same effect as in the above first embodiment can be obtained. Moreover, in this embodiment, by transmitting the data signals WDT, RDT separately from the transmission of the command signal CMD and the address signal AD, the transmission rates of the data signals WDT, RDT can be improved. Especially in the write operation, the command signal CMD, the address signal AD, and the write data signal WDT are prevented from centering on a single optical cable OPT1, so that the transmission rate of the optical signal in the write operation can be improved.

Figure 9:
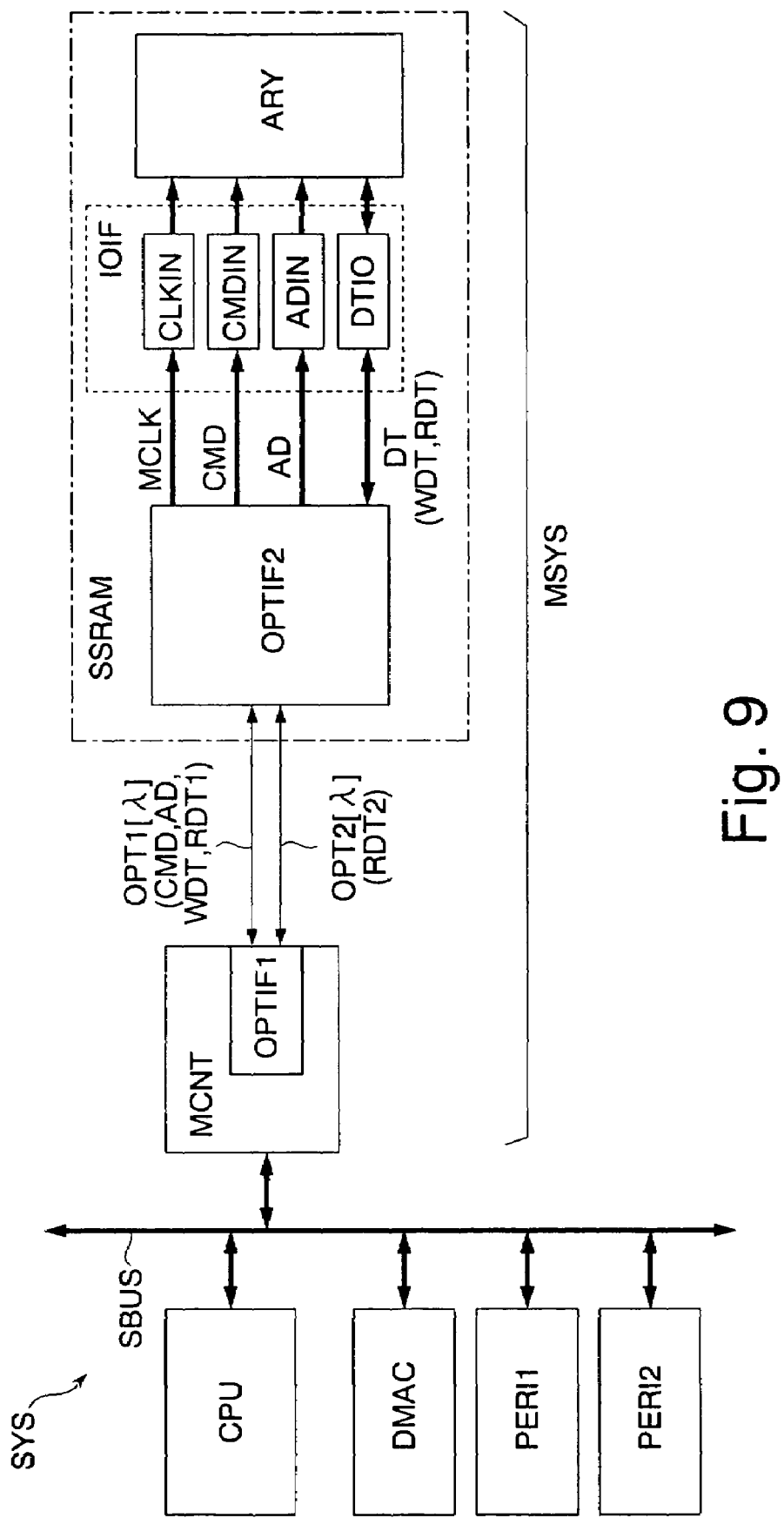
FIG. 9 is a block diagram showing a third embodiment.
Figure 10:
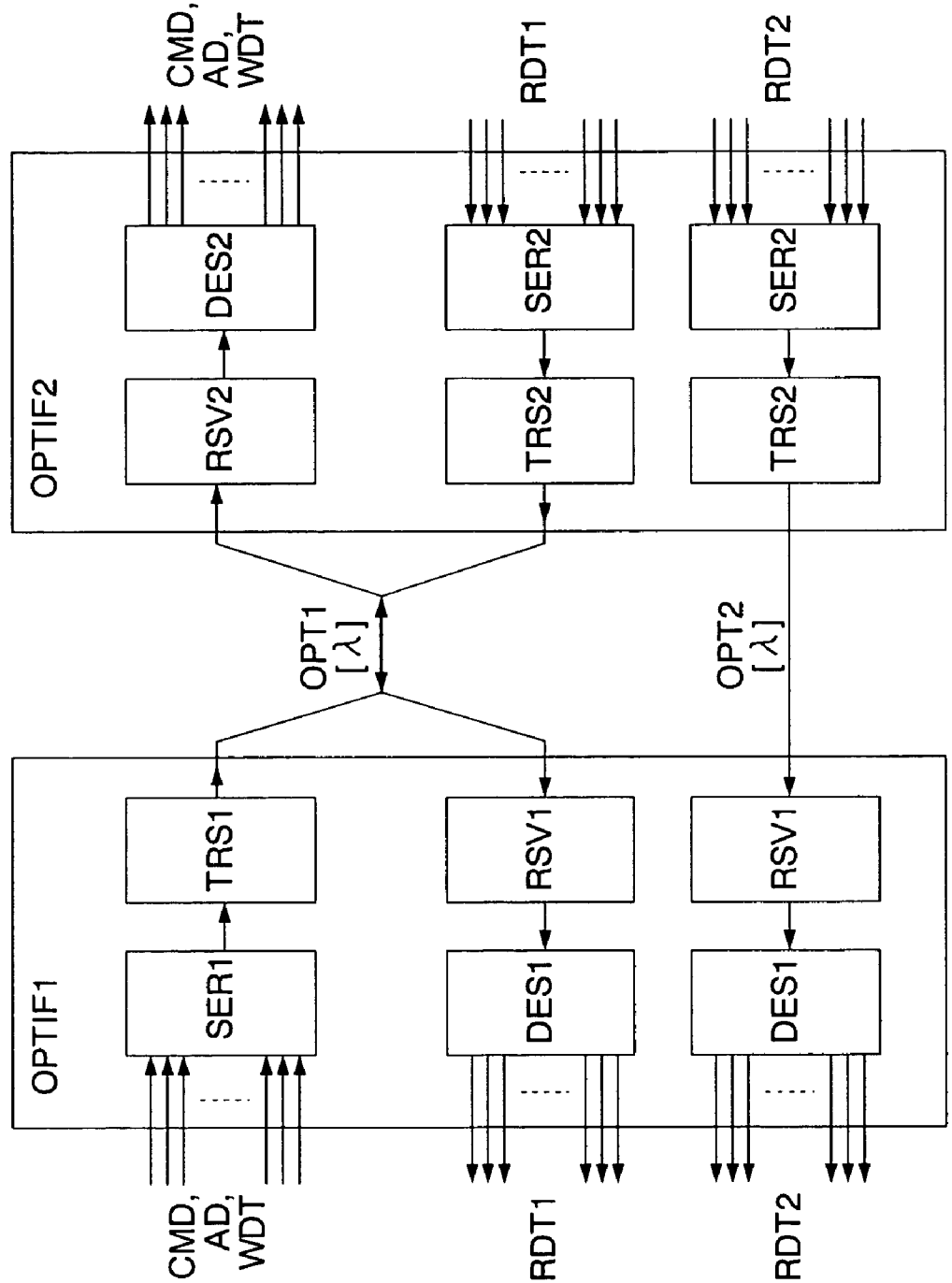
FIG. 10 is a block diagram showing the details of the optical interface unit of FIG. 9.

FIG. 9 shows a third embodiment of the present invention. The same numerals and symbols will be used to designate the same elements as those described in the first and second embodiments, and the detailed description thereof will be omitted. In this embodiment, the optical transmission line which connects the optical interface units OPTIF1-2 is configured using two optical cables OPT1-2. Optical signals with the single wavelength λ are transmitted to the optical cables OPT1-2. The optical cable OPT1 (first optical transmission line) transmits the command signal CMD, the address signal AD, the write data signal WDT, and partial bits (RDT1) of the read data signal RDT as the first optical signal between the optical interface units OPTIF1-2. The optical cable OPT2 (second optical transmission line) transmits the remaining bits (RDT2) of the read data signal RDT as the second optical signal from the optical interface unit OPTIF2 to the optical interface unit OPTIF1. Therefore, the optical interface units OPTIF1-2 each include a circuit exclusively for the read data signal RDT as shown in FIG. 10 described later. The other configuration is the same as that of the first embodiment.

FIG. 10 shows the details of the optical interface units OPTIF1-2 shown in FIG. 9. The same numerals and symbols will be used to designate the same elements as those in FIG. 2, and the detailed description thereof will be omitted. The optical interface unit OPTIF1 includes the first optical input unit RSV1 and the first parallel converting unit DES1 exclusively for the read data signal RDT1, and the first optical input signal RSV1 and the first parallel converting unit DES1 exclusively for the read data signal RDT2. The optical interface unit OPTIF2 includes the second serial converting unit SER2 and the second optical output unit TRS2 exclusively for the read data signal RDT1, and the second serial converting unit SER2 and the second optical output unit TRS2 exclusively for the read data signal RDT2. The other configuration is the same as that of FIG. 2.

As described above, also in the third embodiment, the same effects as in the above first and second embodiments can be obtained. Moreover, in this embodiment, by transmitting the read data signal RDT using two optical cables OPT1-2 , the transmission rate of the read data signal RDT can be improved. Generally, the influence of the read access time on the performance of the system SYS is larger than the influence of the write access time on the performance of the system SYS. This is because, in the write operation, the controller MCNT can operate freely after giving the write data signal WDT to the SSRAM, but in the read operation, its operation is restricted until the read data signal RDT is received. Accordingly, the performances of the controller MCNT and the system SYS can be improved.

Figure 11:
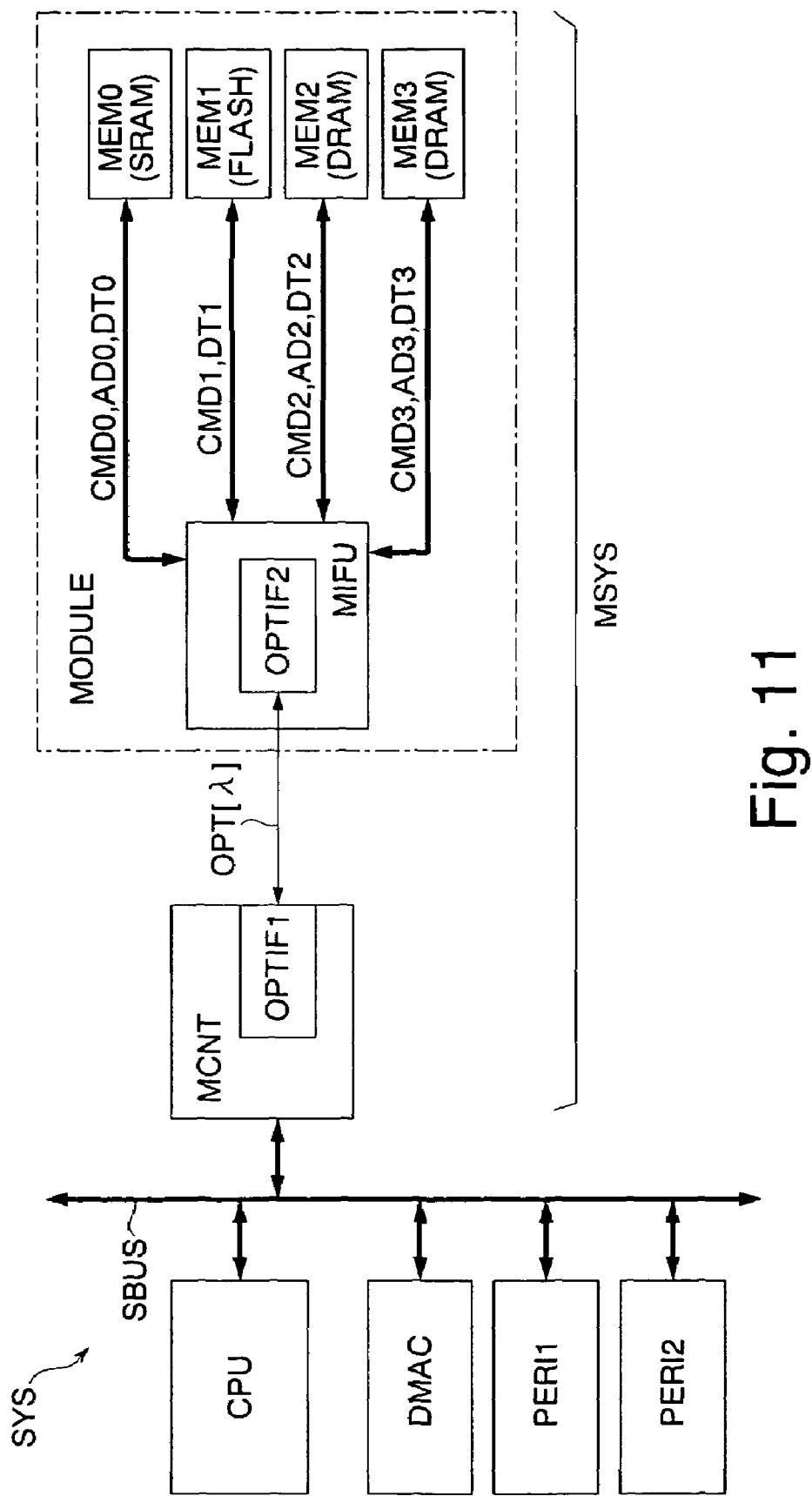
FIG. 11 is a block diagram showing a fourth embodiment.

FIG. 11 shows a fourth embodiment of the present invention. The same numerals and symbols will be used to designate the same elements as those described in the first embodiment, and the detailed description thereof will be omitted. In this embodiment, the memory system MSYS is composed of the memory controller MCNT and a memory module MODULE (memory device). The configurations of the system SYS and the memory system MSYS are the same as those in the first embodiment except that the SSRAM in the first embodiment is replaced with the memory module MODULE.

The memory module MODULE is connected to the memory controller MCNT by a single optical cable OPT. The memory controller MCNT is formed by mounting the optical interface unit OPTIF1 and an optical connector not shown on a printed-circuit board or the like. The memory module MODULE is formed by mounting a memory interface unit MIFU and semiconductor memory devices MEM (MEM0, MEM1, MEM2, MEM3; memory units) on a printed-circuit board or the like. The memory interface unit MIFU is formed by mounting the optical interface unit OPTIF2 and an optical connector not shown thereon. The memory devices MEM0, MEM1, MEM2, MEM3 are for example, a high-speed SRAM, a flash memory FLASH, a DRAM, and a DRAM.

The memory device MEM may be a clock synchronous type or a clock asynchronous type. When the clock synchronous-type memory device MEM is mounted on the memory module MODULE, a memory clock generated by the optical interface unit OPTIF2 is used. As in the first embodiment, the memory clock is the clock generated in synchronization with the synchronous clock outputted from the optical interface unit OPTIF1.

A command signal CMD0, an address signal AD0, and a data signal DT0 are access signals to the memory device MEM0 (SRAM). For example, the command signal CMD0 is composed of a chip select signal /CS, a write enable signal /WE, and an output enable signal /OE. A command signal CMD1 and a data signal DT1 are access signals to the memory device MEM1 (FLASH). For example, the command signal CMD1 is composed of a command latch enable CLE, an address latch enable ALE, a chip enable signal /CE, and so on.

A command signal CMD2, an address signal AD2, and a data signal DT2 are access signals to the memory device MEM2 (DRAM). Similarly, a command signal CMD3, an address signal AD3, and a data signal DT3 are access signals to the memory device MEM3 (DRAM). For example, the command signals CMD2, CMD3 are each composed of a chip select signal /CS, a row address strobe signal /RAS, a column address strobe signal /CAS, and so on.

The controller MCNT outputs the parallel command signal CMD0-3, address signal AD0, 2-3, and write data signal DT0-3 (WDT) as the first optical signal OPT to the memory module MODULE. At this time, the controller MCNT outputs a device signal (DEV shown in FIG. 12 described later) indicating the memory device MEM to be accessed with the command signal CMD0-3 and so on as the first optical signal OPT. The memory module MODULE outputs the read data signal DT0-3 (RDT) as the second optical signal OPT to the controller MCNT. At this time, the memory module MODULE outputs the device signal DEV indicating the accessed memory device MEM with the read data signal DT0-3.

In this embodiment, the command signal CMD0-3, the address signal AD0, 2-3, and the data signal DT0-3 to access the memory device MEM are serially transmitted using a single optical cable OPT and the optical signal OPT with the single wavelength. Consequently, as in the first embodiment, the transmission rate of signals transmitted between the controller MCNT and the memory module MODULE can be improved at a minimum cost.

Figure 12:
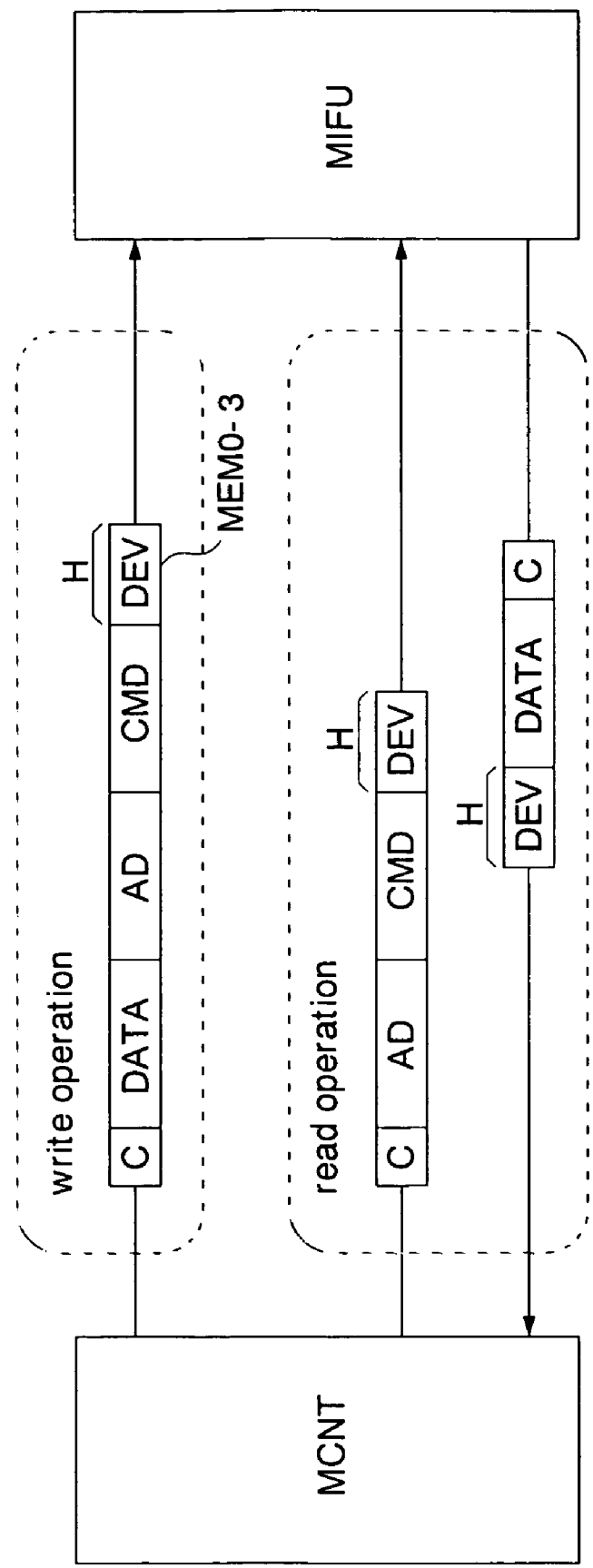
FIG. 12 is an explanatory diagram showing an operation of the memory system according to the fourth embodiment.

FIG. 12 shows an operation of the memory system MSYS of the fourth embodiment. In this embodiment, the header H includes a device signal DEV (device number) indicating the memory device MEM0-3 to be accessed. In a write operation of the FLASH, address information is transmitted as the data signal DT, so that the address signal AD is not used. The other configuration, such as the configuration of commands, is the same as that of the first embodiment (FIG. 5).

As described above, also in the fourth embodiment, the same effect as in the above first embodiment can be obtained. Further, in this embodiment, the memory module MODULE including plural kinds of memory devices MEM can be accessed using a single optical cable OPT. As a result, the transmission rate of signals transmitted between the controller MCNT and the memory module MODULE can be improved at a minimum cost.

Figure 13:
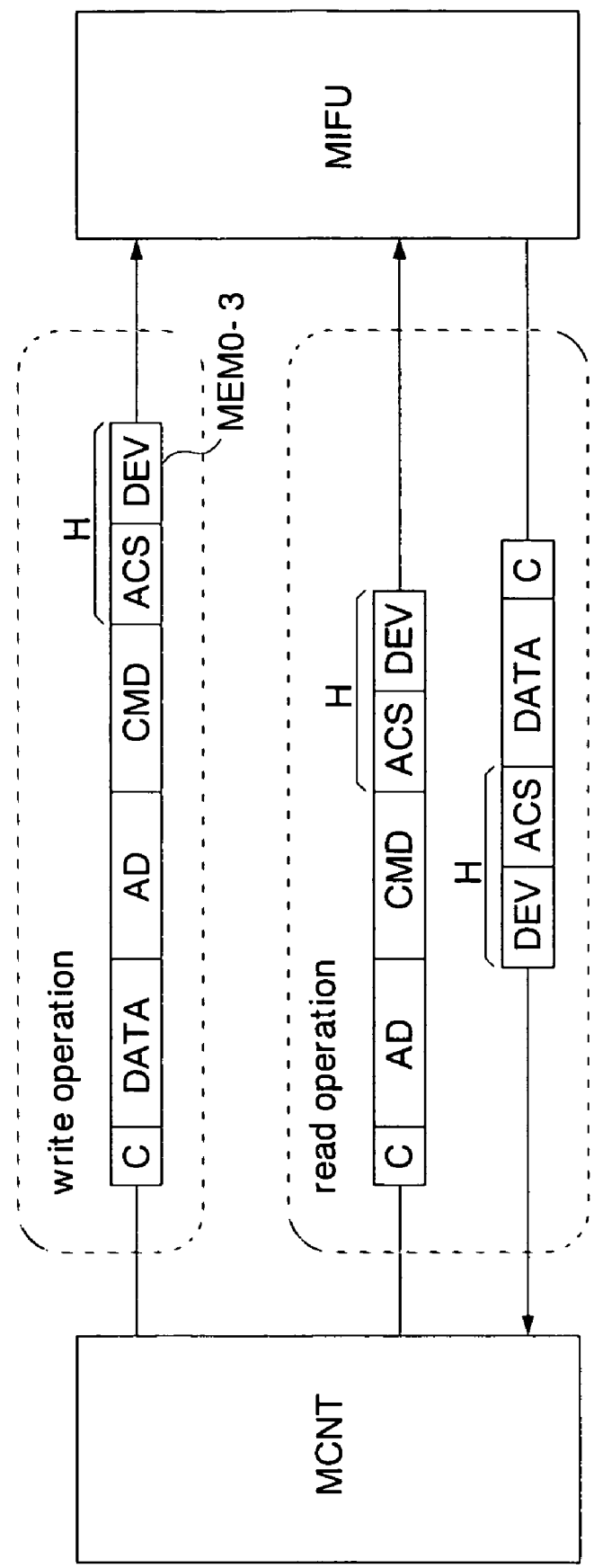
FIG. 13 is an explanatory diagram showing an operation of the memory system according to the fifth embodiment.

FIG. 13 shows an operation of the memory system MSYS in a fifth embodiment of the present invention. The same numerals and symbols will be used to designate the same elements as those described in the first and fourth embodiments, and the detailed description thereof will be omitted. In this embodiment, the header H includes the device signal DEV (device number) and an order signal ACS (access number). The other configuration is the same as that of the fourth embodiment (FIG. 11). Namely, the memory system MSYS includes the controller MCNT and the memory module MODULE, and the memory module MODULE includes four memory devices MEM.

The controller MCNT outputs the order signal ACS (access number) indicating the order of the memory device MEM to be accessed, together with the parallel command signal CMD0-3, address signal AD0, 2-3, and write data signal DT0-3 (WDT), as the first optical signal OPT to the memory module MODULE. The memory module outputs the order signal ACS outputted from the controller MCNT, together with the read data signal DT (RDT), as the second optical signal to the controller MCNT. The optical signal with the single wavelength λ is transmitted to the optical cable OPT.

As described above, also in the fifth embodiment, the same effects as in the above first and fourth embodiments can be obtained. Moreover, in this embodiment, by using the order signal ACS (access number), the controller MCNT can easily determine the memory device MEM which has outputted the read data signal RDT even if the access time varies greatly among the memory devices MEM.

Figure 14:
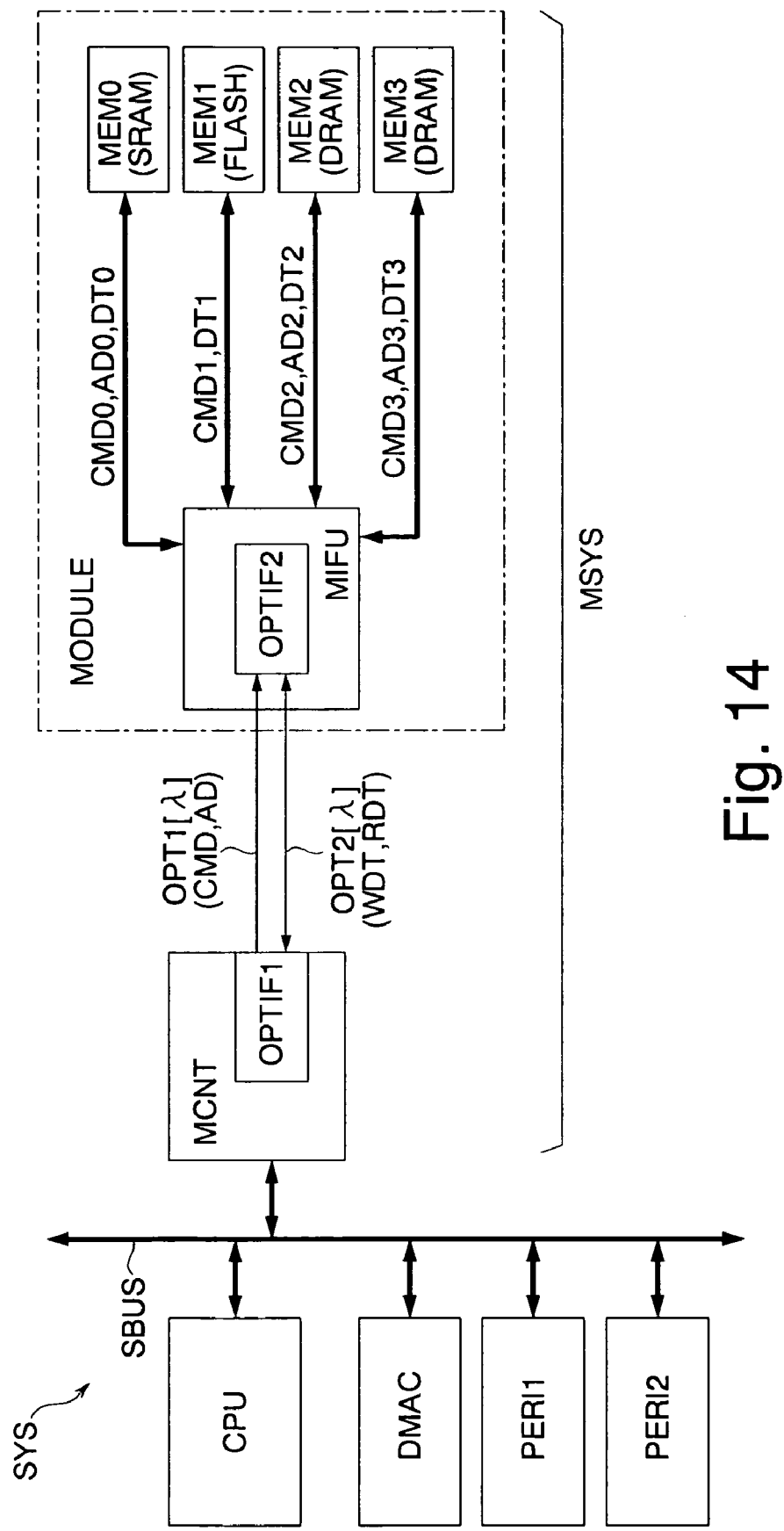
FIG. 14 is a block diagram showing a sixth embodiment.

FIG. 14 shows a sixth embodiment of the present invention. The same numerals and symbols will be used to designate the same elements as those described in the first and fourth embodiments, and the detailed description thereof will be omitted. In this embodiment, the optical transmission line which connects the optical interface units OPTIF1-2 is configured using two optical cables OPT1-2. Optical signals with the single wavelength λ are transmitted to the optical cables OPT1-2. The optical cable OPT1 (first optical transmission line) transmits the command signal CMD and the address signal AD as the first optical signal from the optical interface unit OPTIF1 to the optical interface unit OPTIF2. The optical cable OPT2 (second optical transmission line) transmits the write data signal WDT and the read data signal RDT as the first and second optical signals between the optical interface units OPTIF1-2. Therefore, the optical interface units OPTIF1-2 each include a circuit exclusively for the write data signal WDT. Namely, this embodiment is configured by providing the optical interface units OPTIF1-2 of the second embodiment (FIG. 8) in the fourth embodiment (FIG. 11). As described above, also in the sixth embodiment, the same effects as in the above first, second, and fourth embodiments can be obtained.

Figure 15:
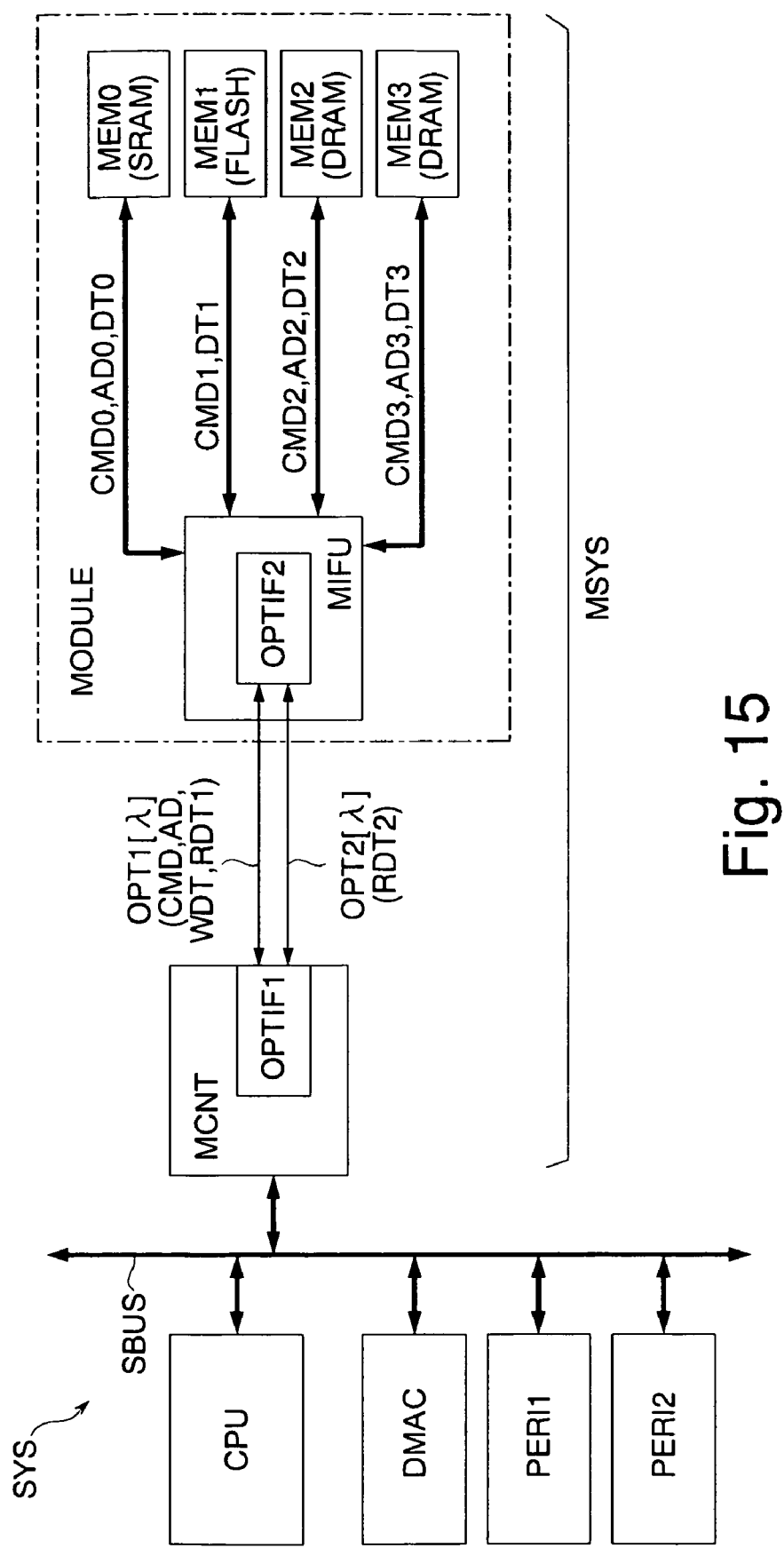
FIG. 15 is a block diagram showing a seventh embodiment.

FIG. 15 shows a seventh embodiment of the present invention. The same numerals and symbols will be used to designate the same elements as those described in the first and fourth embodiments, and the detailed description thereof will be omitted. In this embodiment, the optical transmission line which connects the optical interface units OPTIF1-2 is configured using two optical cables OPT1-2. Optical signals with the single wavelength λ are transmitted to the optical cables OPT1-2. The optical cable OPT1 (first optical transmission line) transmits the command signal CMD, the address signal AD, the write data signal WDT, and partial bits (RDT1) of the read data signal RDT as the first optical signal between the optical interface units OPTIF1-2. The optical cable OPT2 (second optical transmission line) transmits the remaining bits (RDT2) of the read data signal RDT as the second optical signal from the optical interface unit OPTIF2 to the optical interface unit OPTIF1. Therefore, the optical interface units OPTIF1-2 each include a circuit exclusively for the read data signal RDT. Namely, this embodiment is configured by providing the optical interface units OPTIF1-2 of the third embodiment (FIG. 10) in the fourth embodiment (FIG. 11). As described above, also in the seventh embodiment, the same effects as in the above first, third, and fourth embodiments can be obtained.

Figure 16:
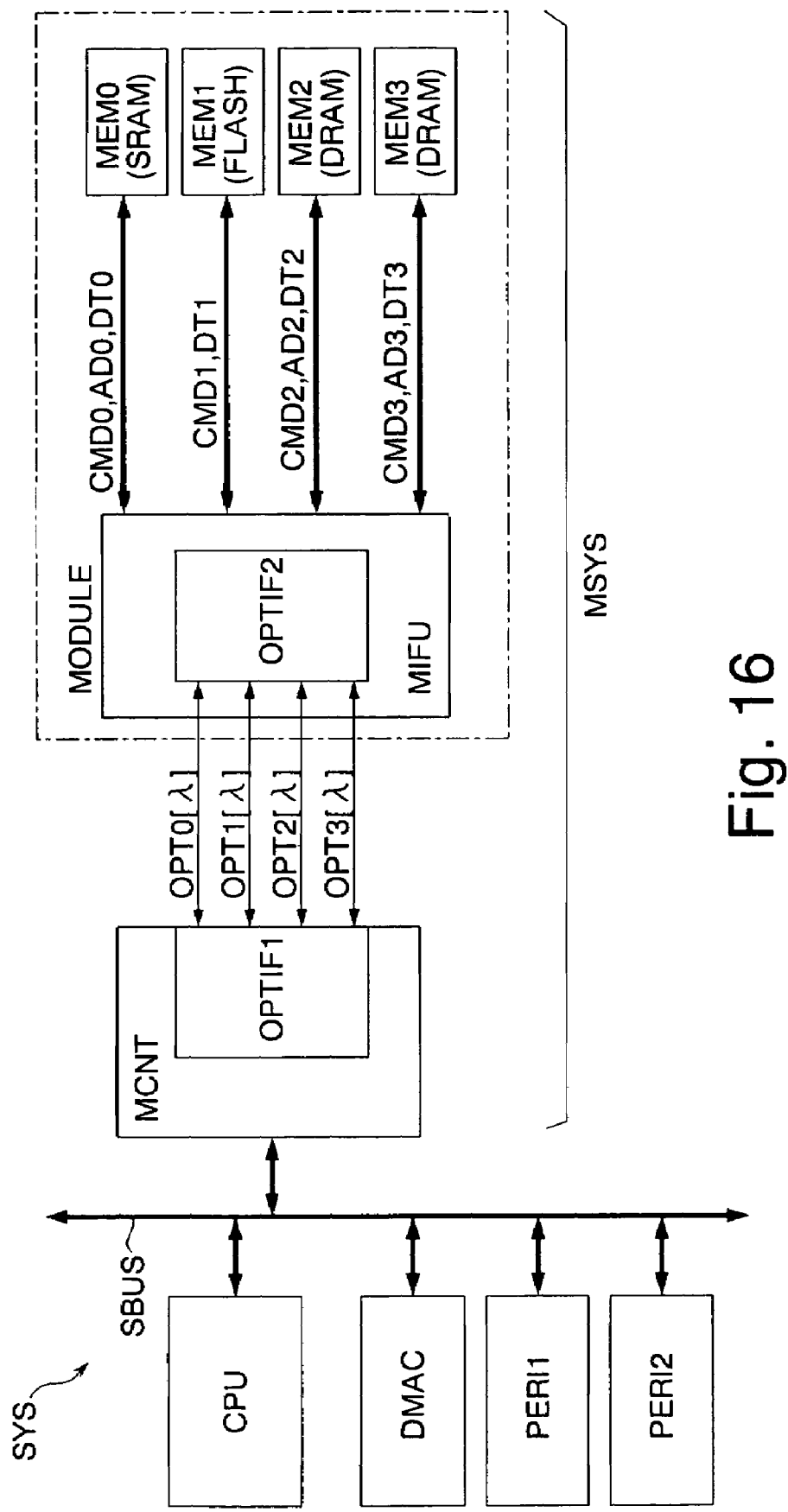
FIG. 16 is a block diagram showing a eighth embodiment.

FIG. 16 shows an eighth embodiment of the present invention. The same numerals and symbols will be used to designate the same elements as those described in the first and fourth embodiments, and the detailed description thereof will be omitted. In this embodiment, the optical transmission line which connects the optical interface units OPTIF1-2 is configured using four optical cables OPT0-3 (first to fourth optical transmission lines) corresponding to the memory devices MEM0-3, respectively. In other words, the optical cables OPT0-3 are optical transmission lines exclusively for accessing the memory devices MEM0-3, respectively. Optical signals with the single wavelength λ are transmitted to the optical cables OPT0-3. As described above, also in the seventh embodiment, the same effects as in the above first and fourth embodiments can be obtained.

Figure 17:
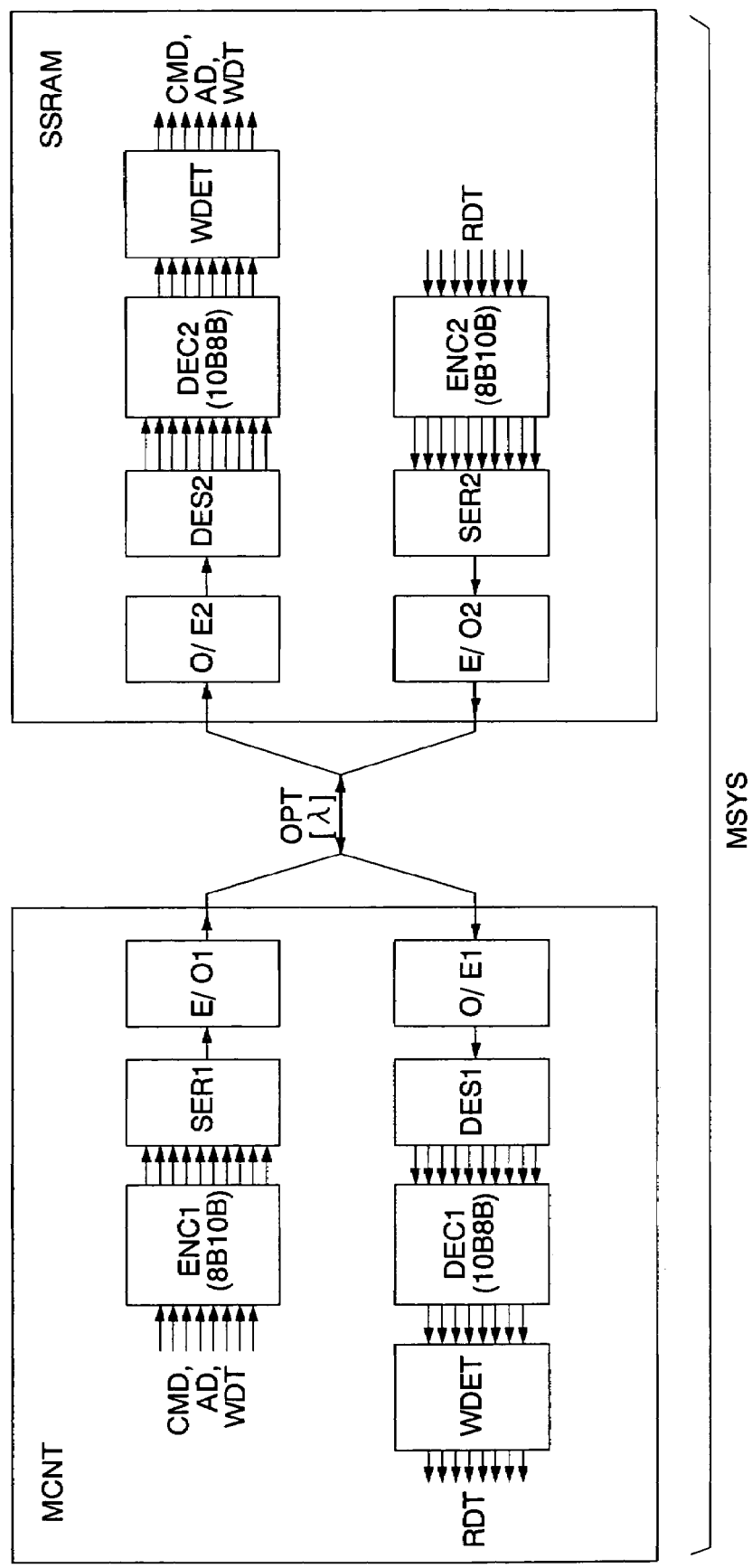
FIG. 17 is a block diagram showing a ninth embodiment.

FIG. 17 shows a ninth embodiment of the present invention. The same numerals and symbols will be used to designate the same elements as those described in the first embodiment, and the detailed description thereof will be omitted. In this embodiment, in the controller MCNT, for example, the parallel command signal CMD, address signal AD, and write data signal WDT are encoded by an 8B10B encoder ENC1 and then supplied to the first serial converting unit SER1. The first serial converting unit SER1 converts the parallel access signals into a serial signal. On the other hand, the parallel read data signal RDT converted by the first parallel converting unit DES1 is decoded by a 10B8B decoder DEC1, and then delimiters of read data are detected by a comma detector WDET.

In the SSRAM, the parallel command signal CMD, address signal AD, write data signal WDT converted by the second parallel converting unit DES2 are decoded by a 10B8B decoder DEC2, and then delimiters of write data are detected by the comma detector WDED. On the other hand, the parallel read data signal RDT is encoded by an 8B10B encoder ENC2 and supplied to the second serial converting unit SER2. The other configuration is the same as that of the first embodiment (FIG. 2). As described above, also in the eighth embodiment, the same effect as in the above first embodiment can be obtained.

Note that the above first to third and seventh embodiments describe the example in which the SSRAM is mounted on the memory system MSYS. The present invention is not limited to these embodiments. For example, an SDRAM, an FCRAM (Fast Cycle RAM), a flash memory, or a ferroelectric memory may be mounted on the memory system MSYS. The same goes for the fourth to sixth embodiments.

The above fourth to sixth embodiments describe the example in which the memory system MSYS is configured using the memory module MODULE on which plural kinds of semiconductor memory devices MEM0-3 are mounted. The present invention is not limited to these embodiments. For example, the memory system MSYS may be configured using a hard disk device in place of the semiconductor memory devices MEM. Alternatively, the memory system MSYS may be configured using a memory provided on a network. In this case, an I/O device connected to the network and so on are placed at positions of the memory devices MEM shown in FIG. 11.

The above embodiments describe the example in which optical signals are transmitted by half-duplex communication. The present invention is not limited to these embodiments. For example, optical signals may be transmitted by duplex communication. In this case, the transmission rate can be further improved.

The invention is not limited to the above embodiments and various modifications may be made without departing from the spirit and scope of the invention. Any improvement may be made in part or all of the components.

What is claimed is:

1. A memory system comprising:
a memory device which includes a memory unit to store data;
a controller to access said memory unit; and
an optical transmission line which is provided between said memory unit and said controller, wherein
said controller comprises:
a first serial converting unit which converts a parallel command signal, address signal, and write signal into a first serial signal in order to read/write data from/to said memory unit;
a first optical converting unit to output to said memory device said first serial signal as a first optical signal with a single wavelength via said optical transmission line; and
a first parallel converting unit to convert a second optical signal supplied from said memory device into a parallel read data signal, and
said memory device comprises:
a second parallel converting unit to convert said first optical signal into the original parallel command signal, address signal, and write data signal and output the converted parallel signals to said memory unit;
a second serial converting unit to convert a parallel read data signal from said memory unit into a second serial signal; and
a second optical converting unit to output to said controller said second serial signal as said second optical signal with a single wavelength via said optical transmission line, and wherein:
before starting reading/writing data from/to said memory unit, said controller outputs, as said first optical signal, to said memory device, a first synchronous clock to synchronize an operation of said memory device with an operation of said controller;
said memory device generates a second synchronous clock synchronized with said first synchronous clock and outputs the generated second synchronous clock as said second optical signal; and
said controller starts reading/writing data from/to said memory unit in response to reception of said second synchronous clock.

2. The memory system according to claim 1, wherein:
said memory unit has plural operation modes; and
in response to the reception of said second synchronous clock, said controller further outputs as said first optical signal a command signal to set an operation mode of said memory unit to any one of said operation modes, outputs as said first optical signal a command signal to read the operation mode set in said memory unit, and starts reading/writing data from/to said memory unit when said second optical signal outputted from said memory device indicates a correct operation mode.

3. The memory system according to claim 2, wherein:
when said second optical signal outputted from said memory device indicates an incorrect operation mode, said controller outputs again said first synchronous clock as said first optical signal to synchronize the operation of said memory device without starting reading/writing data from/to said memory unit.

4. The memory system according to claim 1, wherein:
said controller outputs said first synchronous clock to said memory device at intervals even after starting reading/writing data from/to said memory unit; and
said memory device outputs said read data signal as said second optical signal to said controller during a period which does not overlap with a period in which said first synchronous clock is output.

5. The memory system according to claim 1, wherein said optical transmission line includes a single optical transmission line through which said command signal, said address signal, said write data signal, and said read data signal are transmitted as said first and second optical signals.

6. The memory system according to claim 1, wherein said optical transmission line includes a first optical transmission line through which said command signal and said address signal are transmitted as said first optical signal and of a second optical transmission line through which said write data signal and said read data signal are transmitted as said first and second optical signals.

7. A memory system comprising:
a memory device which includes a memory unit to store data;
a controller to access said memory unit; and
an optical transmission line which is provided between said memory unit and said controller, wherein
said controller comprises:
- a first serial converting unit to converts a parallel command signal, address signal, and write signal into a first serial signal in order to read/write data from/to said memory unit;
- a first optical converting unit to output to said memory device said first serial signal as a first optical signal with a single wavelength via said optical transmission line; and
- a first parallel converting unit to convert a second optical signal supplied from said memory device into a parallel read data signal, and said memory device comprises:
- a second parallel converting unit to convert said first optical signal into the original parallel command signal, address signal, and write data signal and output the converted parallel signals to said memory unit;
- a second serial converting unit to convert a parallel read data signal from said memory unit into a second serial signal; and
- a second optical converting unit to output to said controller said second serial signal as said second optical signal with a single wavelength via said optical transmission line, and wherein:

said optical transmission line includes a first optical transmission line through which said command signal, said address signal, said write data signal, and part of said read data signal are transmitted as said first and second optical signals and of a second optical transmission line through which remainder of said read data signal is transmitted as said second optical signal.

8. A memory system comprising:
a memory device which includes a memory unit to store data;
a controller to access said memory unit; and
an optical transmission line which is provided between said memory unit and said controller, wherein
said controller comprises:
- a first serial converting unit to convert a parallel command signal, address signal, and write signal into a first serial signal in order to read/write data from/to said memory unit;
- a first optical converting unit to output to said memory device said first serial signal as a first optical signal with a single wavelength via said optical transmission line; and
- a first parallel converting unit to convert a second optical signal supplied from said memory device into a parallel read data signal, and said memory device comprises:
- a second parallel converting unit to convert said first optical signal into the original parallel command signal, address signal, and write data signal and output the converted parallel signals to said memory unit;
- a second serial converting unit to convert a parallel read data signal from said memory unit into a second serial signal; and
- a second optical converting unit to output to said controller said second serial signal as said second optical signal with a single wavelength via said optical transmission line, and wherein:

said memory device comprises plural kinds of memory units;
said controller outputs a device signal to said memory device as said first optical signal together with said parallel command signal, address signal and write data signal, the device signal indicating a memory unit to be accessed; and
said memory device outputs a device signal to said controller as said second optical signal together with said read data signal, the device signal indicating an accessed memory unit.

9. The memory system according to claim 8, wherein
said controller outputs an order signal to said memory device as said first optical signal together with said parallel command signal, address signal and write data signal, the order signal indicating an order in which memory units are accessed; and
said memory device outputs said order signal to said controller as said second optical signal together with said read data signal.

10. The memory system according to claim 8, wherein
said optical transmission line includes a single optical transmission line through which said command signal, said address signal, said write data signal, and said read data signal are transmitted as said first and second optical signals.

11. The memory system according to claim 8, wherein
said optical transmission line includes a first optical transmission line through which said command signal and said address signal are transmitted as said first optical signal and of a second optical transmission line through which said write data signal and said read data signal are transmitted as said first and second optical signals.

12. The memory system according to claim 8, wherein
said optical transmission line includes a first optical transmission line through which said command signal, said address signal, said write data signal, and part of said read data signal are transmitted as said first and second optical signals and of a second optical transmission line through which remainder of said read data signal is transmitted as said second optical signal.

13. The memory system according to claim 8, wherein
said optical transmission line includes an optical transmission line dedicated for each of said memory units.

* * * * *